April 8, 1930.  A. P. LUNNEY ET AL  1,753,934
WINDSHIELD SOLUTION FEEDER
Filed June 3, 1929
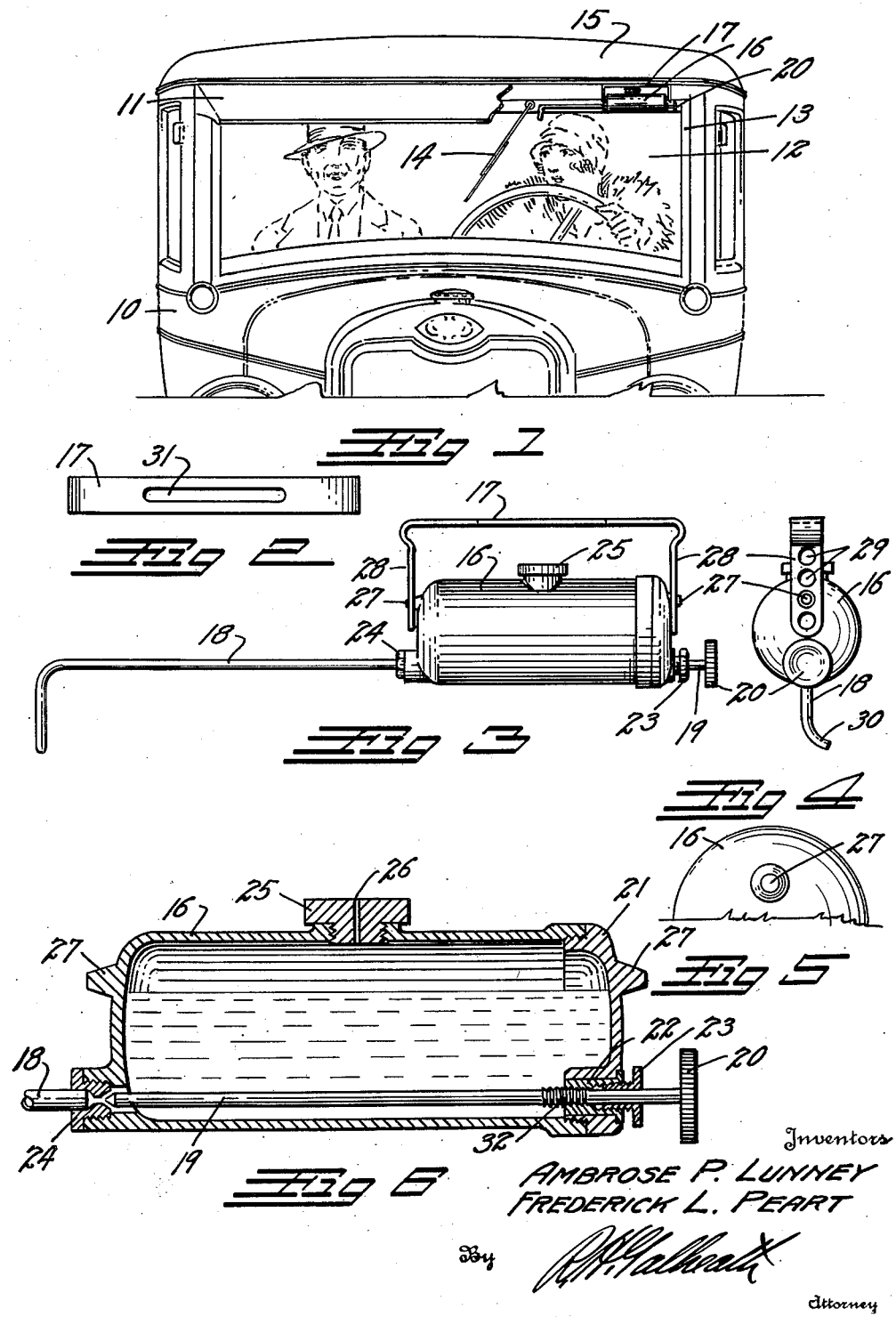
Inventors
AMBROSE P. LUNNEY
FREDERICK L. PEART
By
Attorney Patented Apr. 8, 1930

1,753,934

UNITED STATES PATENT OFFICE

AMBROSE P. LUNNEY AND FREDERICK L. PEART, OF DENVER, COLORADO

WINDSHIELD SOLUTION FEEDER

Application filed June 3, 1929. Serial No. 368,172.

This invention relates to a solution feeder for automobile windshields and has for its principal object the provision of a simple, compact and efficient container and feeding mechanism which will be inconspicuous when in use and which will supply a solution to an automobile windshield to be spread thereon by the usual windshield wiper.

The invention is particularly designed for containing a non-freeze solution which will be wiped across the windshield by the wiper so as to prevent snow, sleet, etc. from adhering to the glass. It can, however, be used to supply water or cleaning solutions to the wiper so that mud, dirt, dust, etc., will be quickly eliminated.

Another object of the invention is to so construct the device that it will be universal in its attachment, that is, so that it can be attached to any automobile without the necessity of drilling or tapping holes etc.

A further object of the invention is to provide a supporting bracket for the container from which the container can be immediately released without the use of tools for filling purposes.

A still further object of the invention is to combine a needle valve with a container so as to form a neat, compact, and efficient unit, which will be entirely concealed by the visor of the automobile.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 illustrates a front elevation of an automobile with the visor thereof partially broken away to illustrate the position of the invention thereon.

Fig. 2 is a plan view of the bracket employed for supporting the container.

Fig. 3 is a front elevation of the complete invention.

Fig. 4 is an end elevation thereof.

Fig. 5 is an enlarged detail end elevation of the container illustrating one of the supporting bosses.

Fig. 6 is an enlarged longitudinal vertical section through the container.

In Fig. 1 an automobile is designated in its entirety by the numeral 10 with its visor at 11, windshield at 12, windshield frame at 13, windshield wiper at 14, and top at 15. In the majority of automobiles, the top 15 projects forwardly beyond the windshield frame 13, and the visor 11 of the automobile is secured under the projecting top 15 by means of suitable screws.

In the usual installation the invention is installed upon the automobile by employing one of the visor screws to support it from the projecting top 15.

The invention comprises a solution container 16 supported from a bracket 17 and provided with a discharge spout or tube 18. The flow through the discharge tube 18 is controlled by means of a needle valve 19 terminating in a suitable operating handle 20.

The container 16 is preferably cast or molded from "bakelite" or similar material, but may if desired be formed from metal. To admit of a molded construction, a cap 21 is threaded into one extremity of the container. This allows the molding die to be withdrawn from the interior of the container and from the interior of the cap, after which the cap is threaded into the container and is cemented or soldered permanently in place.

A packing gland fitting 22 is molded into the cap 21 at the time of the forming thereof. The needle valve 19 is threaded through the packing gland 22 on threads 31 and is packed by means of a suitable packing nut 23. A valve seat fitting 24 is threaded into the opposite extremity of the container 16. The valve seat fitting 24 carries a seat as illustrated arranged to be closed by the extremity of the needle valve 19. The discharge tube 18 is soldered or otherwise secured in the valve seat fitting 24.

It can be readily seen that when the needle valve 19 is unscrewed, solution is free to flow from the container 16 through the fitting 24 into the discharge tube 18. The container is filled by removing a filling plug 25 which is threaded into a boss on the upper side thereof and provided with an air hole 26.

The bracket 17 is formed of spring material and is provided with two downwardly projecting arms 28 in each of which a series of perforations 29 are formed. Upon the extremities of the container round tapered projections or supporting bosses 27 are formed. The container is supported in the bracket by spreading the arms 28 and placing the bosses 27 in any desired one of the openings 29. The natural elasticity of the bracket will cause the arms to firmly engage the container and wedge the openings 29 upon the tapered sides of the bosses 27 so that it will be held firmly in place without vibration.

A series of the openings 29 is provided to suit different types of automobiles. In some automobiles the top 15 will be further from the windshield frame 13 than in others, so that the bosses 27 must be placed in different pairs of the openings 29 to properly position the container on different makes of automobiles. It is preferred to have the container substantially align with the windshield frame 13 as illustrated in Fig. 1, so that it will not be visible from the interior of the car and so that it will be entirely concealed by the visor 11.

The extremity of the discharge tube 18 extends to the left and turns downwardly and inwardly as shown at 30, adjacent the pivot point of the windshield wiper 14 so that solution will feed upon the windshield at the apex of the segment described by the wiper. The inwardly turned extremity 30 of the tube will contact with, or come in close proximity to, the windshield 12. This allows the capillary attraction of the windshield to draw the drops of solution from the tube. The container can be easily rotated in the bracket 29 to bring the extremity 30 to the desired position.

It is desired to call attention to the universal application of the bracket 17. Usually it is installed as shown in Fig. 1. In some cases it must be attached to the visor 11 and in other cases to the front of the automobile or windshield frame 13. Regardless of the position of attaching it will always support the container 16 in the proper position since it can rotate about the bosses 27. The upper portion of the bracket 17 is provided with an elongated opening 31 so that screws already in place upon the automobile can be employed to attach the bracket without affecting its horizontal position.

If desired, the construction of the bosses 27 and the openings 29 can be reversed, that is, bosses can be formed on the bracket 27 to engage in a depression on the tank 16.

While a specific form of the improvement has been described and illustrated herein, it is desired to be understood that the same may be varied within the scope of the appended claims, without departing from the spirit of the invention.

Having thus described the invention, what is claimed and desired secured by Letters Patent is:—

1. A device for supplying liquid to an automobile windshield comprising: a horizontally disposed container; means for supporting said container above said windshield; a discharge spout extending from said container over said windshield; a valve arranged to control the flow of solution through said spout; said supporting means comprising: a U-shaped bracket having downwardly depending legs provided with openings and projections formed on said container and adapted to enter said openings.

2. A device for supplying liquid to an automobile windshield comprising: a horizontally disposed container; means for supporting said container above said windshield; a discharge spout extending from said container over said windshield; a valve arranged to control the flow of solution through said spout, said supporting means comprising: a U-shaped bracket having downwardly depending legs provided with openings and projections formed on said container and adapted to enter said openings, said projections comprising: tapered bosses, said bracket being formed of spring material so as to force said legs against the taper of said bosses.

3. A device for supplying liquid to an automobile windshield comprising: a horizontally disposed container; means for supporting said container above said windshield; a discharge spout extending from said container over said windshield; a valve arranged to control the flow of solution through said spout, said supporting means comprising: a U-shaped bracket having downwardly depending legs provided with openings and projections formed on said container and adapted to enter said openings, said projections comprising: tapered bosses, said bracket being formed of spring material so as to force said legs against the taper of said bosses; and provided with an elongated opening to accommodate it to the present screws upon said automobile.

4. A container for windshield solutions comprising: a cylindrical portion; a cap formed in one extremity of said cylindrical portion; a valve seat formed in the other extremity of said cylindrical portion; a valve stem extending through said cap to close said valve seat; and supporting bosses formed on said cylindrical portion and said cap; and means for engaging said bosses so as to support said container.

5. A container for windshield solutions comprising: a cylindrical portion; a cap formed in one extremity of said cylindrical portion; a valve seat formed in the other extremity of said cylindrical portion; a valve stem extending through said cap to close said valve seat; supporting bosses formed on said cylindrical portion and said cap; means for engaging said bosses so as to support said container; said means comprising: a resilient bracket having downwardly depending legs provided with openings arranged to pass over said bosses.

In testimony whereof, we affix our signatures.

AMBROSE P. LUNNEY.
FREDERICK L. PEART.